United States Patent [19]

Franke

[11] Patent Number: 4,757,719

[45] Date of Patent: Jul. 19, 1988

[54] ROUND LOAD LIFTING SLING

[75] Inventor: Heinz Franke, Übach-Palenberg, Fed. Rep. of Germany

[73] Assignee: Spanset Inter AG, Zürich, Switzerland

[21] Appl. No.: 50,021

[22] Filed: May 15, 1987

[30] Foreign Application Priority Data

May 15, 1986 [DE] Fed. Rep. of Germany ....... 3616465

[51] Int. Cl.[4] .............................................. G01B 21/00

[52] U.S. Cl. .................................. 73/760; 73/862.56; 340/675

[58] Field of Search ................ 340/675, 665; 116/212, 116/278; 73/760, 862.56, 862.57, 862.39; 294/74

[56] References Cited

U.S. PATENT DOCUMENTS 3,080,748 3/1963 Burkley .......................... 116/212 X
3,958,455 5/1976 Russell ......................... 73/862.39 X
4,421,352 12/1983 Rave et al. ............................ 294/74

FOREIGN PATENT DOCUMENTS 1570511 7/1980 United Kingdom ................ 340/665

*Primary Examiner*—Jerry W. Myracle
*Attorney, Agent, or Firm*—Spencer & Frank

[57] ABSTRACT

A round load lifting sling composed of an endless skein of threads as a load bearing core and a textile protective tube surrounding the endless skein, the endless skein carrying along a testing conductor which is connected with two connecting contacts which penetrate the wall of the protective tube for connection to a source of testing medium to flow through the testing conductor. Damage or severance of the threads of the skein is detectable by an interruption in flow of the medium due to accompanying damage or severance of the conductor.

11 Claims, 2 Drawing Sheets

ROUND LOAD LIFTING SLING

BACKGROUND OF THE INVENTION

The present invention relates to a round load lifting sling having a load bearing core in the form of threads in an endless skein, and a protective textile tube either woven, or sewn with fabric, surrounding the skein. The structural configuration of such round slings which are also called woven lifting belts, is defined in DIN (German Industrial Standard) 61,360. The threads of the endless belt are made of a synthetic, multifilament material.

At certain time intervals, such round slings must be repeatedly examined for damage. Of necessity, this examination is limited to checking the protective tube for damage since the threads or, more precisely, the endless skein, cannot be visually examined because of the covering of non-transparent textile material surrounding it, although the endless skein alone forms the load carrying core of the round sling.

SUMMARY OF THE INVENTION

It is an object of the present invention to provide a round sling of the above-mentioned type in which its endless skein can be examined for damage without particular expertise. This is accomplished with a testing conductor carried by the endless skein, which conducts a testing medium. The conductor is connected with two connecting ends or connecting contacts, with the connecting contacts penetrating the wall of the protective tube. Thus, the sling of the invention includes a load bearing core including an endless skein of threads, an annular textile protective tube having a wall surrounding the skein, and a testing conductor for conducting a testing medium, carried by the endless skein, the testing conductor having connecting ends at opposite ends thereof penetrating the wall of the tube so as to be connectable to a source of the testing medium.

The invention is based on the realization that the load carrying capability of a round sling is adversely affected if one of the many windings of the threads or, more precisely, of the load carrying endless skein, is damaged (partially severed) or entirely severed. Such damage or severing of the endless skein has an externally measurable influence on the passage of the testing medium applied to the ends of the testing conductor. The material properties of the testing conductor should be such that, if there is an overload in the longitudinal direction, first the endless skein and then the testing conductor break.

The connection of the two ends of the testing conductor with the protective tube of the sling can be established particularly easily. Providing that the testing conductor has the same length as the endless skein and is carried along over the entire length of the endless skein ensures that the entire length of the endless skein can be examined for damage by the testing conductor. This can be ensured in a simple manner in that the testing conductor is spun together with the threads of the endless skein. The testing conductor may be embedded completely in the thread of the endless skein (except at the connecting ends), thus assuring in an advantageous manner that it will not come into direct contact with the testing conductor of an adjacent winding of the endless skein.

The greater expandability of the testing conductor compared to the expandability of the thread of the endless skein can be realized, for example, by having the endless conductor extend in a wavy or helical configuration in the longitudinal direction of the thread of the endless skein.

The testing conductor may be an electrical conductor for a current passage test. For this purpose, it may advantageously be encased in insulating material. However, it is likewise possible for the testing conductor to be a photoconductor for a light passage test.

BRIEF DESCRIPTION OF THE DRAWINGS

The invention will be described in greater detail below with reference to an embodiment that is illustrated in the accompanying drawing figures in which.

DESCRIPTION OF THE PREFERRED EMBODIMENT

Figure 1:
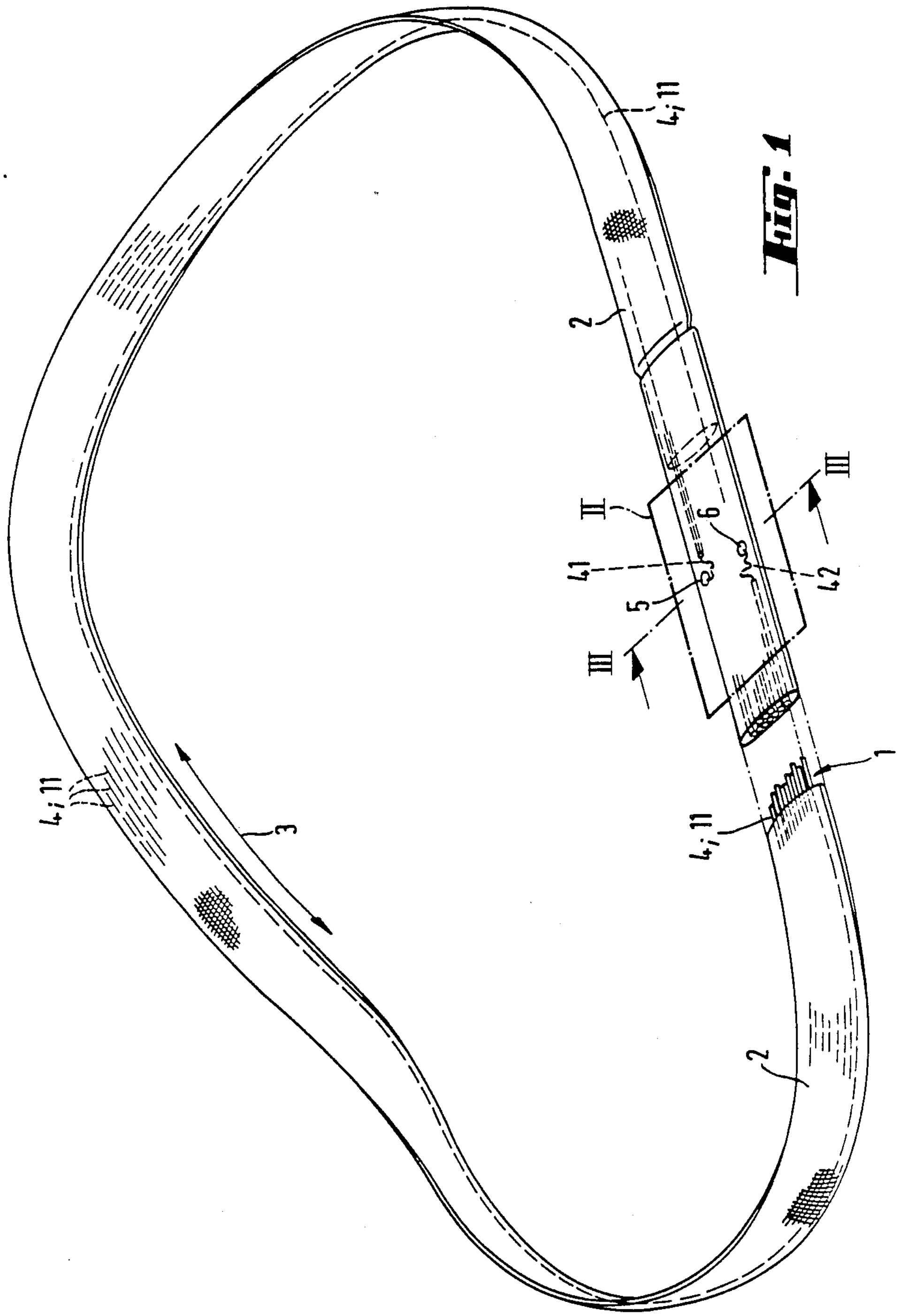
FIG. 1 is an overall perspective view of a round sling of the type according to the invention.
Figure 2:
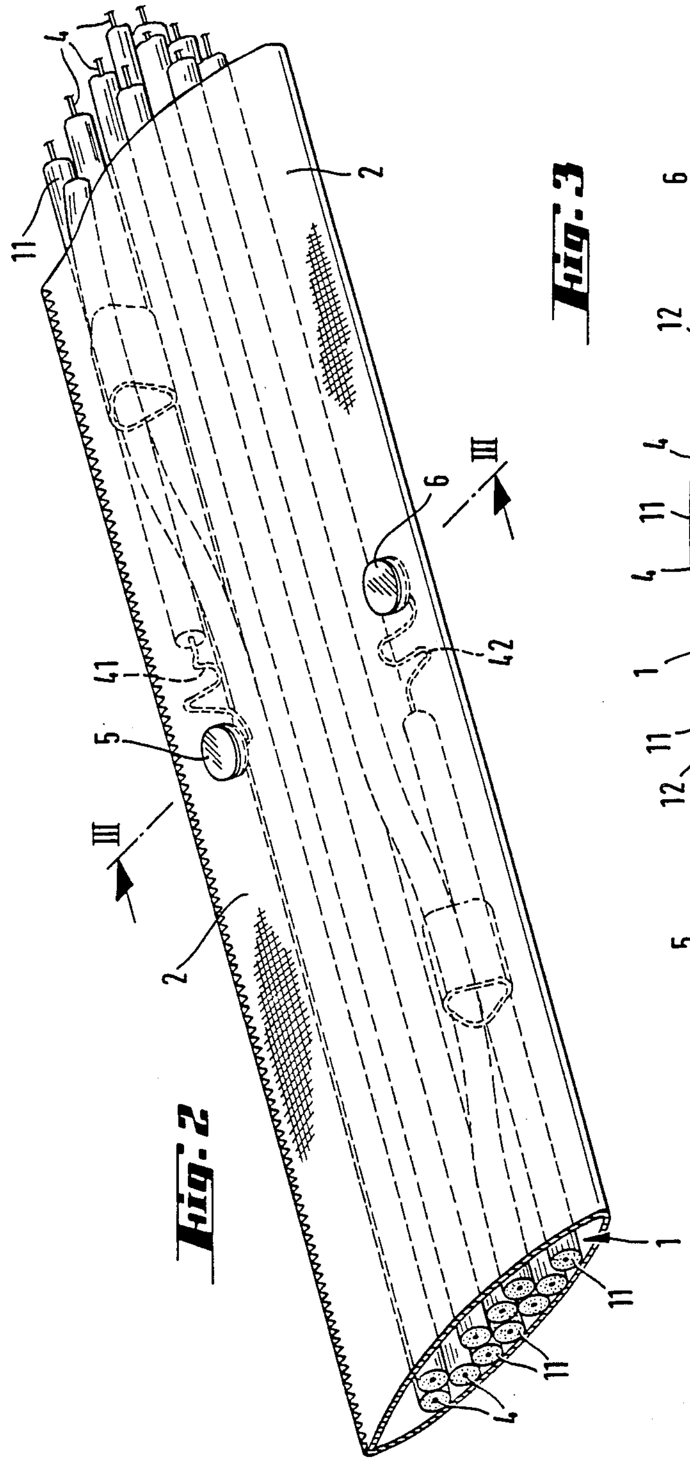
FIG. 2 is an enlarged, cut-away perspective view of the portion II of FIG. 1.
Figure 3:
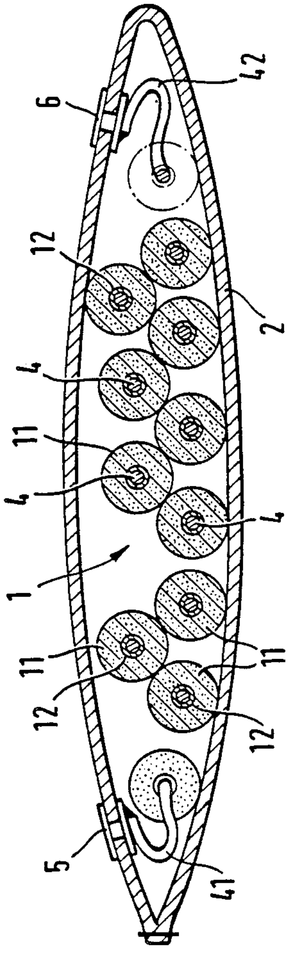
FIG. 3 is an enlarged sectional view along line III—III of FIGS. 1 and 2.

Referring to the figures, the load bearing core of the round sling is composed of threads forming an endless skein 1 of synthetic, multifilament threads, e.g. a polyamide and/or polyester fiber thread. The number of individual windings 11 of juxtaposed skein sections determines the load carrying capability to be handled by the threads in the round sling. The threads of skein 1 are encased by a protective tube 2 which loosely surrounds them. Protective tube 2 is composed of a woven textile hose or of a woven textile fabric that has been sewn together. The protective tube is filled with the threads of endless skein 1 to only about 60% to 70% of its maximum cross-sectional tube area. Moreover, protective tube 2 is folded slightly in the circumferential direction 3 of the round sling so that expansion occurring under load, and thus an increase in the circumferential length of the threads of endless skein 1, will not act as a tensile stress on the tube which would endanger the tube. Due to the looseness with which the threads of endless skein 1 lie in protective tube 2, it is ensured that protective tube 2 can easily be displaced with respect to the threads of endless skein 1 and the individual threads or windings 11 with respect to one another in order to automatically equalize the load.

Endless skein 1 has in its center a testing conductor 4 which is carried along with the threads and whose two ends (41,42) are connected with two connecting ends or, more precisely, connecting contacts 5, 6 for the testing medium, with connecting contacts 5, 6 penetrating the wall of protective tube 2 so that they are externally accessible. The testing conductor 4 suitably extends in a wavy or helical configuration in the longitudinal direction of the threads to assure relatively higher expandability as compared to the threads. If the round sling is provided with a plurality of endless skeins 1 in layers, each endless skein 1 has its own testing conductor 4 equipped with two connecting ends or contacts 5, 6 which are brought out of protective tube 2. Advisably, testing conductor 4 has substantially the same length as its associated endless skein 1 so that it is carried along over the entire length of the skein.

Testing conductor 4 may be an electrical conductor for a current passage test. In such a case, the electrical conductor is advisably encased in insulating material to prevent mutual contact between adjacent portions of the testing conductor in respective adjacent threads or windings 11 of an endless skein 1 or between adjacent testing conductors in the case of a plurality of endless conductors containing skeins 1 in layers. However, testing conductor 4 may also be a photoconductor for a light passage test.

As long as testing conductor 4 is not damaged, it is easy to determine, even by a person who is not an expert, by means of a simple passage testing device, whether the testing conductor is still intact or whether it is severed. If no winding 11 of endless skein 1 and the testing conductor therein is severed, the passage testing device will indicate passage. If, however, a thread and testing conductor is severed, the passage testing device will indicate this. For example, for an electrical testing conductor, there will be no current flow. If the testing conductor is a photoconductor, even partial severing of the conductor will be noted optically in a simple manner. In any case, this configuration of the round loop according to the invention permits easy examination to determine whether the load bearing core of the round loop is still undamaged.

The present disclosure relates to the subject matter disclosed in West German patent application Ser. No. P 36 16 465.8-22, filed May 16th, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. Round load lifting sling, comprising:
- a load bearing core including an endless skein of synthetic multi-filament threads;
- an annular textile protective tube having a wall surrounding said skein; and
- a testing conductor for conducting a testing medium, carried by, and having same length as, said endless skein, said testing conductor
  - being carried by said endless skein along the entire length of said skein,
  - having a longitudinal expandability at least as large as the longitudinal expandability of said threads, and
  - having connecting ends at opposite ends thereof penetrating said wall of said tube so as to be connectable to a source of the testing medium.

2. Round sling as defined in claim 1, wherein said connecting ends comprise connecting contacts connected to said opposite ends of said testing conductor.

3. Round sling as defined in claim 1, wherein said testing conductor is substantially completely embedded in said endless skein.

4. Round sling as defined in claim 1, wherein said testing conductor is an electrical conductor connectable at said connecting ends to a current source for performing a current passage test.

5. Round sling as defined in claim 4, further comprising insulating material encasing said electrical conductor.

6. Round sling as defined in claim 1, wherein said testing conductor is a photoconductor connectable at said connecting ends to a source of light for performing a light passage test.

7. Round sling as defined in claim 1, wherein said tube is formed of a sewn textile fabric.

8. Round sling as defined in claim 1, wherein said tube is woven.

9. Round sling as defined in claim 1, wherein the longitudinal expandability of said testing conductor is greater than the longitudinal expandability of said threads.

10. Round load lifting sling, comprising:
- a load bearing core including an endless skein of threads;
- an annular textile protective tube having a wall surrounding said skein; and
- a testing conductor for conducting a testing medium, carried by said endless skein, said testing conductor having connecting ends at opposite ends thereof penetrating said wall of said tube so as to be connectable to a source of the testing medium, said testing conductor extending in the longitudinal direction of said endless skein in a wavy configuration.

11. Round load lifting sling, comprising:
- a load bearing core including an endless skein of threads;
- an annular textile protective tube having a wall surrounding said skein; and
- a testing conductor for conducting a testing medium, carried by said endless skein, said testing conductor having connecting ends at opposite ends thereof penetrating said wall of said tube so as to be connectable to a source of the testing medium, said testing conductor extending in the longitudinal direction of said endless skein in a helical configuration.

* * * * *